United States Patent Office
3,594,272
Patented July 20, 1971

3,594,272
POLYMERIC PRODUCTS OF ALKYLENE-POLY-
AMINE-DIHYDROHALIDES, DICYANDIAMIDE,
FORMALDEHYDE AND EPICHLOROHYDRIN
AND THEIR USE AS RETENTION AIDS IN THE
MANUFACTURE OF PAPER
Kwan Ting Shen, Lakewood, and Gary Wayne Jarvis,
Toms River, N.J., assignors to Ciba Corporation, Summit, N.J.
No Drawing. Filed May 5, 1969, Ser. No. 822,034
Int. Cl. D21h 3/52; C08g 9/00
U.S. Cl. 162—167
6 Claims

ABSTRACT OF THE DISCLOSURE

New polymeric products are provided which are obtained by reacting together about 1 molar proportion of an alkylene-polyamine-dihydrohalide, about 2 molar proportions of dicyandiamide, about 3–5 molar proportions of formaldehyde and about 1–3 molar proportions of epichlorohydrin. The products of this invention are especially useful as retention aids in the manufacture of paper, textile and nonwoven fabrics.

BACKGROUND OF THE INVENTION

Field of the invention

This invention is concerned with polymeric products which are useful as retention aids and with the method of obtaining these products.

In the manufacture of paper, textiles and nonwoven fabrics, finely divided solid materials such as titanium dioxide, china clay, and pigments are added to the starting material in order to whiten the final product, fill and smooth the surface of the final product, increase the opacity, or to color the final product. In addition to the finely divided materials, some materials are added in the form of colloid dispersions, for example, the latices employed in the manufacture of nonwoven fabrics. The fibrous materials which are generally employed to make paper, textiles and nonwoven fabrics, for example, wood pulp, cotton, cotton linter, etc., have little natural affinity for most of the finely divided and colloidally dispersed materials that are added. Since these finely divided materials are generally relatively expensive, it is important that as high a percentage of the material as possible be retained by the final product. In the manufacture of paper it is particularly important that the retention rate be high in order to facilitate the clarification of the white water and to avoid as much as possible pollution by the effluent discharged from the paper making process.

Various types of additives have been suggested to improve retention. However, the additives heretofore suggested have not proven to be entirely satisfactory in that in order to obtain satisfactory retention either the cost per pound of product produced was excessively high or the additives had an adverse effect on the other properties of the product.

It is, accordingly, an object of this invention to provide a retention aid which is both effective as a retention aid for finely divided materials employed in manufacturing paper, textiles and nonwoven fabrics and which does not adversely affect the other desirable properties of the final product.

It is an additional object of this invention to provide an effective retention aid having a relatively low cost per pound of product produced.

It is a still further object of this invention to provide a method for manufacturing said retention aid.

SUMMARY OF THE INVENTION

It has been found that the polymeric products obtained by reacting together an alkylene-polyamine-dihydrohalide, dicyandiamide, formaldehyde and epichlorohydrin are excellent retention aids.

DESCRIPTION OF THE PREFERRED EMBODIMENT

The alkylene-polyamine-dihydrohalides which are employed to make the polymeric products of this invention are represented by the formula

$$NH_2-R_1-(NHR_2)_{\overline{n-1}}-NH_2 \cdot 2HX$$

wherein $R_1$ and $R_2$ are the same or different and each is an alkylene having 4–6 carbon atoms, X is a halogen such as chlorine, bromine or iodine, and $n$ is a whole number from 1–4. Typical compounds of the above-described type are the halide salts of alkylene diamines such as 1,3-butylene diamine, 1,4-butylene diamine, 1,5-pentylene diamine, and 1,6-hexamethylene diamine. In addition, polyalkylene triamines are also employable in this invention, for example, the halide salts of di-1,3-butylene triamine, di-1,4- butylene triamine, di-1,5-pentylene triamine, 1,5-pentylene-1,4-butylene triamine and di-1,6-hexamethylene triamine. A class of polyalkylene-polyamines which have been proven to be quite valuable are the polyalkylene tetra-amines and pentamines. Typical compounds of this class are tri-1,3-butylene tetra-amine, tri-1,4-butylene tetra-amine, tri-1,5-pentylene tetra-amine, tri-1,6-hexamethylene tetra-amine, tetra-1,3-butylene pentamine, tetra-1,4-butylene pentamine, tetra-1,5-pentylene pentamine, and tetra-1,6-hexamethylene pentamine.

The alkylene polyamine reactants employed in this invention can consist of a single alkylene polyamine or may be comprised of a mixture of the above-described alkylene polyamines. It is also quite advantageous from an economic standpoint to employ as the alkylene polyamine certain technical grades of mixed alkylene polyamines which are obtained as by-products from other processes. Of this particular class of alkylene polyamines, particular attention is directed to certain amine by-products of nylon production which consist of about 75% by weight of dihexamethylene triamine, with the remainder being comprised mainly of higher alkylene polyamines and minor amounts of other by-products such as lactams. From an economical standpoint, the cost of these amines, being by-products, is relatively low. Furthermore, the retention aids prepared from by-products are equivalent in properties to the products produced from the purified amines, but have a considerably lower cost.

With regard to the alkylene polyamines in general, it should be noted that dihexamethylene triamine, whether employed in a substantially chemically pure form or in the technical grade described above, is the preferred alkylene polyamine for employment in this invention. Dihexamethylene triamine is readily available, the reaction to form the retention aid proceeds without difficulty, and the final product exhibits superior retention properties.

The polyamines noted above are well-known in themselves and can readily be obtained by known processes. The salts of the alkylene polyamine are prepared in the usual manner by reacting the alkylene polyamine with a hydrohalic acid. This can be done in situ as the initial step in the preparation of the polymeric products of this invention.

With regard to the halide salts, it should be noted that, while the hydrobromide and hydroiodide salts of the above-described alkylene polyamines are suitable for utilization in the present invention, the hydrochlorides are preferred. The preferred salt of an alkylene polyamine for employment in this invention is the dihexamethylene triamine dihydrochloride.

The polymeric products of this invention are obtained by reacting together about 1 molar proportion of the alkylene polyamine described above, about 2 molar proportions of dicyandiamide, about 3–5, preferably 4, molar proportions of formaldehyde, and about 1–3, preferably 2, molar proportions of epichlorohydrin.

The process for obtaining the products of this invention is advantageously conducted in two stages. In the first stage, the initial step is the formation of the salt of the alkylene polyamine. An aqueous solution is prepared which contains about 2 molar proportions of the hydrohalic acid, for example, hydrochloric acid. In general, an aqueous solution which contains 15–20% by weight of the acid is quite satisfactory as the starting reaction medium. An amount equivalent to about 2 molar proportions of the alkylene polyamine is added to the aqueous solution over an extended period, for example, 1½ to 3 hours at a temperature of about 20–25° C. About 2 molar proportions of dicyandiamide are then added to the aqueous reaction media. Thereafter, 3–5 molar proportions of an aqueous solution of formaldehyde, for example, a 37% formaldehyde solution, is gradually added over a 45 minute period. The reaction mixture is then heated to about 75–90° C., preferably about 85° C., and maintained at this temperature for 1–2 hours and then cooled to about 40° C.

In the second stage, about 1–3 molar proportions of epichlorohydrin are added to the reaction product prepared in the first stage while holding the mixture at about 40° C. The temperature is then raised to about 60–70° C., preferably 65° C., and maintained at this temperature until the product having about a 50% concentration has a Gardner-Holdt viscosity of between P and T. The product is then cooled to room temperature and diluted to the desired concentration. The final product in a 35% aqueous solution at 25° C. should have a Gardner-Holdt viscosity of about B–C.

The polymeric products of this invention are useful as retention aids with various types of fibrous material and with a variety of different types of finely divided solid additives. For example, products of this invention may be advantageously employed in paper manufacture with paper furnishes consisting of wood pulp, cotton, cotton linter, or blends of these fibers. The textiles and nonwoven fabrics with which the products of the present invention are most useful are made of cellulosic fibers such as cotton and rayon and of blends of fibers containing cellulosic fibers. The products of this invention are effective in substantially increasing the retention of fillers such as china clay, talc, and the like. The products are also useful in increasing retention of pigments such as colored organic pigments or inorganic pigments such as carbon black, and are especially useful as retention aids for titanium dioxide. The products are also quite valuable as dyestuff fixatives and to increase the retention of paper fines.

The products of this invention are added to the treating liquors which contain the finely divided materials that are intended to be retained by the final product. For example, when paper is the final product, the polymeric products of this invention are added to the paper furnish before it is formed on the paper machine. The products may be added at an early step in the paper making process, for example, at either the beater or pulpers, or may be added at a later point in the process, even as late as in the head box. It is, of course, important that the products be added sufficiently early in the paper making process or with sufficient agitation to insure relatively uniform distribution of the products through the furnish. In textile treatment, the polymeric products of this invention are added to the dye bath, and in non-woven fabrics the retention aid is added to the slurry of fibers and additives before formation of the nonwoven fabric.

The amount of the product that is added is dependent on the particular fibrous material employed and the type and amount of finely divided solid material that is added. In general, amounts as low as ⅛ lb. of the product per ton of material is sufficient to significantly increase the percent retention. However, amounts of ⅛ lb. of retention aid per ton, or even more, preferably ½ lb. of retention aid per ton, give a considerably higher percentage of retention. Even higher amounts of the retention aid can advantageously be employed, especially when an unusually large amount of the finely divided material is added.

The following examples are given by way of illustration only and are not intended in any way to limit the scope of the subjoined claims. The parts given in the examples below, unless otherwise stated, are to be understood to be parts by weight and not parts by volume.

EXAMPLE 1

146.4 g. of 37.4% hydrochloric acid were diluted with 148.4 g. of water. To this acid solution were added over two hours at 20–25° C., 161.3 g. of dihexamethylene triamine. Thereafter, 126 g. of dicyanodiamide were added quickly and followed by the addition of 243.3 g. of 37% formaldehyde. The reaction mixture was heated to 85° C. for 1½ hours and then cooled to 40° C. 69.4 g. of epichlorohydrin was added and the temperature was held at 40° C. for about ½ hour. The temperature was then raised to 65° C. and maintained at this temperature until the Gardner-Holdt viscosity of a 50% by weight solution reached about T. The mixture was cooled to 25° C. and diluted with 348.3 g. of water. The final product was a dark brown, thin solution with a pH of 8.1, solids content 35% and a final Gardner-Holdt viscosity of B.

EXAMPLE 2

Example 1 was repeated with the exception that dihexamethylene triamine employed in Example 1 was replaced with 161.3 g. of technical grade dihexamethylene triamine containing 75% by weight of hexamethylene, with the remainder consisting primarily of higher polyalkylene polyamides.

EXAMPLE 3

Example 1 was repeated with the exception that 87 g. of 1,6-hexamethylene diamine was employed in place of the dihexamethylene triamine.

EXAMPLE 4

Example 1 was repeated with the exception that the dihexamethylene triamine was replaced with 119 g. of di-1,4-butylene triamine.

EXAMPLE 5

Example 1 was repeated with the exception that the dihexamethylene triamine was replaced with 162 g. of tri-1,4-butylene triamine.

EXAMPLE 6

Example 1 was repeated with the exception that the dihexamethylene triamine was replaced with 268 g. of tetra-1,5-pentylenepentamine.

EXAMPLE 7

Example 1 was repeated with the exception that the dihexamethylene triamine was replaced with 310 g. of tetra-1,6-hexamethylene pentamine.

EXAMPLE 8

In order to determine the retention properties of the polymeric products prepared in Examples 1–7, the percent retention of titanium dioxide of a furnish comprised of 90% by weight of bleach sulfite pulp having a Canadian Freeness of 420–425 and 10% by weight of $TiO_2$ was evaluated by preparing a blank without any retention aid and by adding the retention aids prepared in Examples 1-7 to the furnish at the beaters. The paper was formed on a laboratory scale Fourdrinier machine.

| Product of Example No. | Percent retention of TiO$_2$ | | |
|---|---|---|---|
| | ⅛ lb./ton | ¼ lb./ton | ½ lb./ton |
| Blank | 3.2 | 3.2 | 3.2 |
| 1 | 13.1 | 36.8 | 71.7 |
| 2 | 12.8 | 33.2 | 71.9 |
| 3 | 8.0 | 19.0 | 50.0 |
| 4 | 12.2 | 29.5 | 63.0 |
| 5 | 9.0 | 27.0 | 59.0 |
| 6 | 14.0 | 28.5 | 61.0 |
| 7 | 13.4 | 31.9 | 69.5 |

What is claimed is:
1. The polymeric reaction product of
(a) about 1 molar proportion of an alkylene-polyaminedihydrohalide of the formula

$$NH_2R_1-(NHR_2)_{n-1}-NH_2 \cdot 2HX$$

wherein $R_1$ and $R_2$ are the same or different and each represents an alkylene having 4-6 carbon atoms, X is chlorine, bromine or iodine and $n$ is a whole number from 1 to 4;
(b) about 2 molar proportions of dicyandiamide;
(c) about 3-5 molar proportions of formaldehyde, and
(d) about 1-3 molar proportions of epichlorohydrin, which product has been produced by initially reacting the alkylene-polyaminedihydrohalide, the dicyandiamide and the formaldehyde in an aqueous medium at a temperature of 75-90° C. for 1-2 hours, thereafter adding the epichlorohydrin and heating to 60-70° C. until a 50% aqueous solution at 25° C. has a Gardner-Holdt viscosity of between P and T.

2. The product according to claim 1 wherein said alkylene-polyamine-dihydrohalide is a dihydrochloride of dihexamethlyene triamine.
3. The product according to claim 1 of
(a) 1 molar proportion of dihexamethylene triamine;
(b) 2 molar proportions of dicyandiamide;
(c) 4 molar proportions of formaldehyde, and
(d) 1-2 molar proportions of epichlorohydrin.
4. In the manufacture of paper from a paper furnish which contains finely divided solid materials, the improved process of increasing the retention of the solid material which comprises adding to the paper furnish a retention effective amount of the polymeric product according to claim 1.
5. The process according to claim 4 wherein said polymeric product is added in an amount from ⅛ to ½ lb. per ton of paper furnish.
6. In the manufacture of paper from a furnish which contains titanium dioxide, the improved process for increasing the retention of the titanium dioxide which comprises adding to the furnish about ¼ to ½ lb. of the product according to claim 3.

References Cited
UNITED STATES PATENTS

| 2,334,545 | 11/1943 | D'Alelio | 260—72X |
| 2,769,797 | 11/1956 | Sven et al. | 260—29.4X |
| 2,902,472 | 9/1959 | Cook | 260—72 |

S. LEON BASHORE, Primary Examiner
F. FREI, Assistant Examiner

U.S. Cl. X.R.
162—164; 260—29.4, 72